United States Patent
Fujita et al.

(10) Patent No.: US 7,621,566 B2
(45) Date of Patent: Nov. 24, 2009

(54) BRAKE HOSE SUPPORT STRUCTURE

(75) Inventors: Masayuki Fujita, Saitama (JP); Koushi Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 229 days.

(21) Appl. No.: 10/932,011

(22) Filed: Sep. 2, 2004

(65) Prior Publication Data
US 2005/0082821 A1 Apr. 21, 2005

(30) Foreign Application Priority Data
Sep. 9, 2003 (JP) ............................. 2003-316921

(51) Int. Cl.
*F16L 39/02* (2006.01)
(52) U.S. Cl. ............... 285/125.1; 285/122.1; 285/132.1
(58) Field of Classification Search .................. 285/62, 285/122.1, 125.1, 130.1, 131.1, 32, 132.1; 280/279, 276; 29/33 T, 781, 282; 248/647, 248/503
See application file for complete search history.

(56) References Cited
FOREIGN PATENT DOCUMENTS

| JP | 62-24312 B2 | 5/1987 |
|---|---|---|
| JP | 62-22469 Y2 | 6/1987 |
| JP | 5-305892 A | 11/1993 |
| JP | 6-87482 A | 3/1994 |
| JP | 2001063547 | * 3/2001 |
| JP | 2002-2575 A | 1/2002 |
| JP | 2002178974 A | * 6/2002 |
| JP | 2002187588 | * 7/2002 |

OTHER PUBLICATIONS

USPTO translation of JP Sho 62-22469 dated Jul. 2006.*
USPTO translation of JP 2001-63547 dated Jul. 2006.*
USPTO translation of JP 2002-187588 dated Jul. 2006.*

(Continued)

*Primary Examiner*—James M Hewitt
*Assistant Examiner*—Jay R Ripley
(74) *Attorney, Agent, or Firm*—Birch, Stewart, Kolasch & Birch, LLP (57) ABSTRACT

A brake hose support structure for a vehicle having a first brake hose connected to a master cylinder, and second and third brake hoses connected respectively to left and right brake calipers. The first, second, and third hoses are joined to each other on a front fender. The joining between these brake hoses is accomplished by a hose joint having of a three-way joint fixed to a right side surface portion of the front fender. The second brake hose connected to the brake caliper on the left side is disposed bridgingly on a rear surface of the fender relative to a top portion of the front fender, and extends from the right side surface portion of the fender to the left side surface portion of the fender. The resulting configuration provides intake efficiency and cooling efficiency for the vehicle without causing increases in the number of component parts.

11 Claims, 5 Drawing Sheets

OTHER PUBLICATIONS

"Genuine Honda OEM Parts.: Front Brake Master Cylinder Parts for Honda CBR900RR 2000" web page, http://www.motosport.com/street/oem.php?make=HONDA&type=SPORT&model=CBR900RR&year=2000&groupId=53044, accessed Feb. 5, 2009.*

"Genuine Honda OEM Parts.: Front Brake Master Cylinder Parts for Honda CBR600F4 2002" web page, http://www.motosport.com/street/oem.php?make=HONDA&type=SPORT&model=CBR600F4&year=2002&groupId=52421, accessed Feb. 10, 2009.*

"Genuine Honda OEM Parts.: Front Brake Master Cylinder Parts for Honda CBR900RR 2002" web page, http://www.motosport.com/street/oem.php?make=HONDA&type=SPORT&model=CBR900RR&year=2002&groupId=53046, accessed Feb. 4, 2009.*

"Honda Press Information 2000 CBR900RR FireBlade" document, accessed from web page http://www.hoc.org.uk/gallery/press/2000/2000_CBR900RR_FireBlade.pdf, available to public on Jul. 6, 2001.*

* cited by examiner

BRAKE HOSE SUPPORT STRUCTURE

CROSS-REFERENCE TO RELATED APPLICATION

The present application is related to Japanese Patent Application No. 2003-316921 filed on Sep. 9, 2003, the entire contents of which are hereby incorporated by reference.

BACKGROUND OF THE INVENTION

1. Field of the Invention

The present invention relates to a support structure for brake hoses in a hydraulic type disk brake system.

2. Description of Background Art

A hydraulic type disk brake provided for a front wheel of a motorcycle, for example, is so constructed that when a brake lever is gripped by the driver, an output hydraulic pressure from a master cylinder is transmitted through a first brake hose to a hose joint, where the output hydraulic pressure is distributed into second and third brake hoses and thereby transmitted to each of left and right brake calipers, to exert a braking force on a brake disk. See, for example, Japanese Utility Model Publication No. Sho 62-22469, and Japanese Patent Publication No. Sho 62-24312

However, in the case where the hose joint at which the first brake hose is joined to the second and third brake hoses is fixed to a bottom bridge integrally connecting left and right front fork portions to each other, the second and third brake hoses pass vertically between the bottom bridge and a front fender, so that the airflows to an intake port of an air cleaner and a radiator, which are disposed on the rear side of the bottom bridge, are obstructed.

As a measure for coping with this problem, a method may be contemplated in which a baffle plate or plates are provided to guide running airflows to the intake port and the radiator. Though this method can improve intake efficiency and cooling efficiency, however, the method leads to increases in the number of component parts and in weight.

In addition, there is also the problem that the bottom bridge to which the hose joint is fixed is located at an upper position spaced from the front fender by a comparatively large distance, so that the second and third brake hoses would be long, leading to an increase in weight.

SUMMARY AND OBJECTS OF THE INVENTION

The present invention has been made in consideration of the above-mentioned circumstances. Accordingly, it is an object of the present invention to secure sufficient intake efficiency and cooling efficiency, without causing increases in the number of component parts or in weight.

In order to solve the above problems, according to the present invention, a structure is provided for supporting brake hoses ranging from a master cylinder to brake calipers on a vehicle, wherein A first brake hose (for example, a first brake hose 51 in the embodiment described later) connected to the master cylinder (for example, a master cylinder M in the embodiment described later) and second and third brake hoses (for example, a second brake hose 52 and a third brake hose 53 in the embodiment described later) connected to the left and right calipers (for example, brake calipers 21 in the embodiment described later) are joined to each other on a front fender (for example, a front fender 37 in the embodiment described later).

With this configuration, the brake hose(s) passing vertically on the front side of the intake port and the radiator is only the first brake hose, so that the airflow inhibitive factors blocking the front side of the intake port and the radiator and the length over which the brake hoses are laid are reduced, as compared with the case where the second and third brake hoses pass vertically on the front side of the intake port and the radiator.

In addition, attendant on such a reduction in the airflow inhibitive factors, the need for the baffle plate(s) is eliminated.

In the above configuration, the joint portion (for example, a hose joint 54 in the embodiment described later) of the brake hoses may be provided in the vicinity of a side surface portion (for example, a right side surface portion 37a in the embodiment described later) of the front fender.

Further, the second brake hose or third brake hose may be bridgingly disposed from one side surface portion side to the other surface portion (for example, a left side surface portion 37b in the embodiment described later) side, on the vehicle rear side relative to a top portion (for example, a top portion 37c in the embodiment described later) of the front fender.

In each of these configurations, each of the second and third brake hoses extended from the joint portion toward the left and right brake calipers respectively will not be an airflow inhibitive factor which blocks the front side of the intake port and the radiator.

According to the present invention, the brake hose(s) passing vertically on the front side of the intake port and the radiator is only the first brake hose, so that the airflow inhibitive factors blocking the front side of the intake port and the radiator and the length over which the brake hoses are laid can be reduced, as compared with the case where the second and third brake hoses pass vertically on the front side of the intake port and the radiator. Therefore, sufficient intake efficiency and cooling efficiency can be secured, without leading to an increase in weight.

In addition, since the need for the baffle plate(s) is eliminated because the intake efficiency and cooling efficiency are thus secured, the number of component parts and the weight are not increased, and appearance quality can be enhanced.

Further, each of the second and third brake hoses extended from the joint portion toward the left and right brake calipers respectively would not be an airflow inhibitive factor which blocks the front side of the intake port and the radiator, so that sufficient intake efficiency and cooling efficiency can be secured more assuredly.

However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following description, the front side means the forward running direction of the vehicle (in this embodiment, a motorcycle), and the rear side means the backward running direction of the vehicle. Further, the right side and the left side mean the right side and the left side as viewed from a person facing the forward running side of the vehicle.

Figure 1:
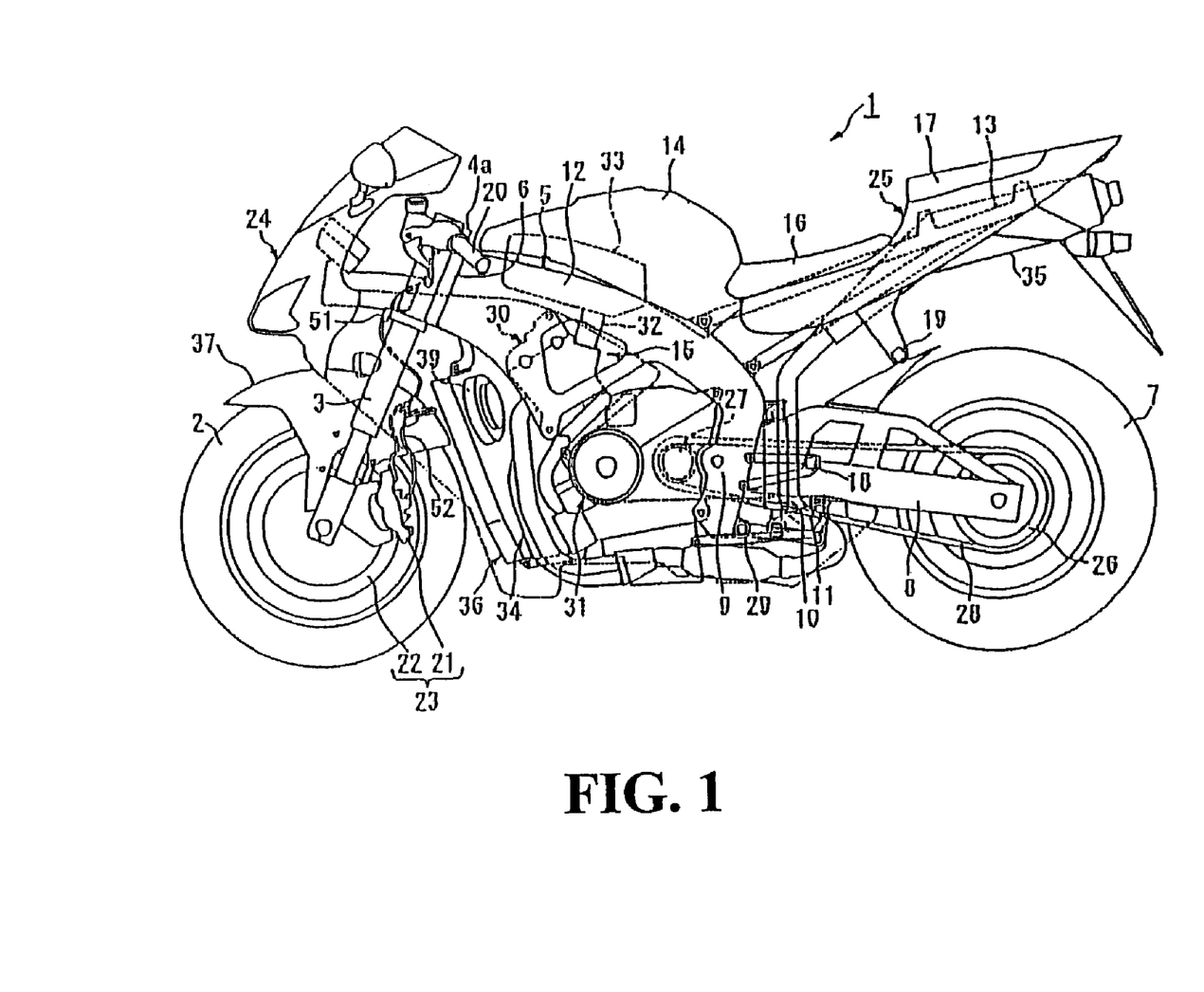
FIG. 1 is a side view of a two-wheel vehicle to which a brake hose support structure according to one embodiment of the present invention has been applied.

As shown in FIG. 1, a front wheel 2 of the motorcycle 1 is shaft-supported on a front fork 3, which is steerably supported on a head pipe 6 provided at a front end portion of a vehicle body frame 5, through a top bridge 4a. A rear wheel 7 of the motorcycle 1 is shaft-supported on a rear fork 8, and the rear fork 8 is swingably supported on a pivot portion 9 and an engine 15 which are provided at intermediate portions of the vehicle body frame 5.

The upper end of a rear cushion unit 10 is mounted to the vicinity of a pivot shaft for the rear fork 8. The lower end of the rear cushion unit 10 is mounted to a lower portion of a main frame 12 through a link mechanism 11, whereby shocks which might otherwise be exerted on the vehicle body through the rear wheel 7 and the rear fork 8 can be absorbed.

The main frame 12 of the vehicle body frame 5 is extended, in the state of being divided into left and right portions, rearwardly downwards from an upper portion of the head pipe 6, and rear end portions of the main frame 12 are bent downwards to be continuous with the pivot portion 9. A seat rail 13 of the vehicle body frame 5 is connected to the rear side of the main frame 12. A fuel tank 14 is disposed on the upper side of the main frame 12, and the engine 15 is disposed on the lower side of the main frame 12.

On the rear side of the fuel tank 14, a driver's seat 16 and a pillion seat 17 for the passenger are supported on the seat rail 13. Steps 18 for the driver are attached to rear portions of the pivot portion 9 of the main frame 12, and steps 19 for the passenger are attached to lower portions of the seat rail 13.

A left-right pair of steering handles 20 are attached to an upper end portion of the front fork 3. Brake calipers 21 are mounted to lower end portions of the front fork 3, while brake rotors 22 corresponding to the brake calipers 21 are attached to the front wheel 2, whereby a left-right pair of front brake devices 23 are constituted.

Incidentally, on the right side of the rear wheel 7, a rear brake device (omitted in the drawings) having the same configuration as that of the front brake device 23 for the front wheel 2 is provided.

The front brake device 23 and the related configuration will be described later.

A front portion of the vehicle body of the motorcycle 1 is covered with a front cowl 24, and the vicinity of the seat rail 13 is covered with a rear cowl 25. A rear sprocket 26 is attached to the left side of the rear wheel 7, and a drive chain 28 is wrapped around the rear sprocket 26 and a drive sprocket 27 disposed on the left side of a rear portion of the engine 15 so that the drive force of the engine can be transmitted to the rear wheel 7.

A storable side stand 29 is disposed at a left lower portion of the vehicle body frame 5 so that the motorcycle 1 can be supported in an erected state, with the vehicle body inclined to the left side.

The engine 15 is a water-cooled type series four-cylinder engine, and integrally includes a shift drum transmission (omitted in the drawings) incorporated in a crankcase 31. A cylinder main body 30 of the engine 15 is disposed on the crankcase 31 in the state of being slightly inclined to the front side.

Throttle bodies 32 corresponding respectively to cylinders are connected to a rear portion of the cylinder main body 30, and each of the throttle bodies 32 is connected to an air cleaner case 33 disposed between the main frame 12 and the fuel tank 14. Intake air coming from an intake port (omitted in the drawings) is introduced into the air cleaner case 33.

Exhaust pipes 34 corresponding respectively to the cylinders are connected to a front portion of the cylinder main body 30.

The exhaust pipe 34 is curved downwards from a front wall of the cylinder main body 30, passes on the lower side of the crankcase 31, is then bent upwards on the rear side of the pivot portion 9, and is connected to a silencer 35 supported on the seat rail 13. On the front side of the exhaust pipes 34, a radiator 36 is disposed in the state of being a little inclined to the front side, similarly to the cylinder main body 30.

The radiator 36 is a round type with its front surface side curved in a recessed shape, and is provided to range vertically from an upper portion of the cylinder main body 30 to a lower portion of the crankcase 31. A left-right pair of radiator fans 39 are mounted to the back surface side of an upper portion of the radiator 36.

Figure 2:
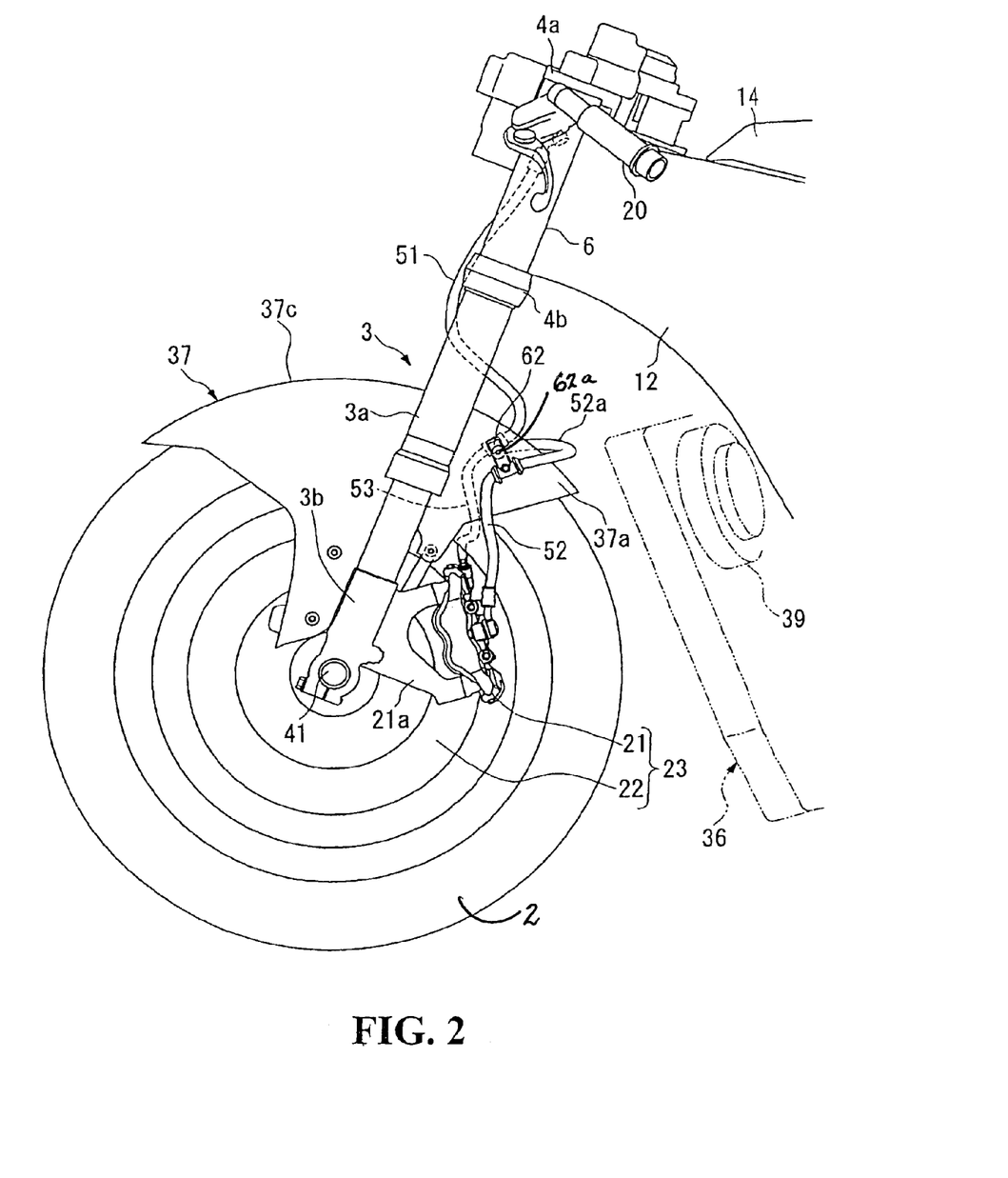
FIG. 2 is a left side view showing a front wheel and the surroundings thereof in the two-wheel vehicle shown in FIG. 1.
Figure 3:
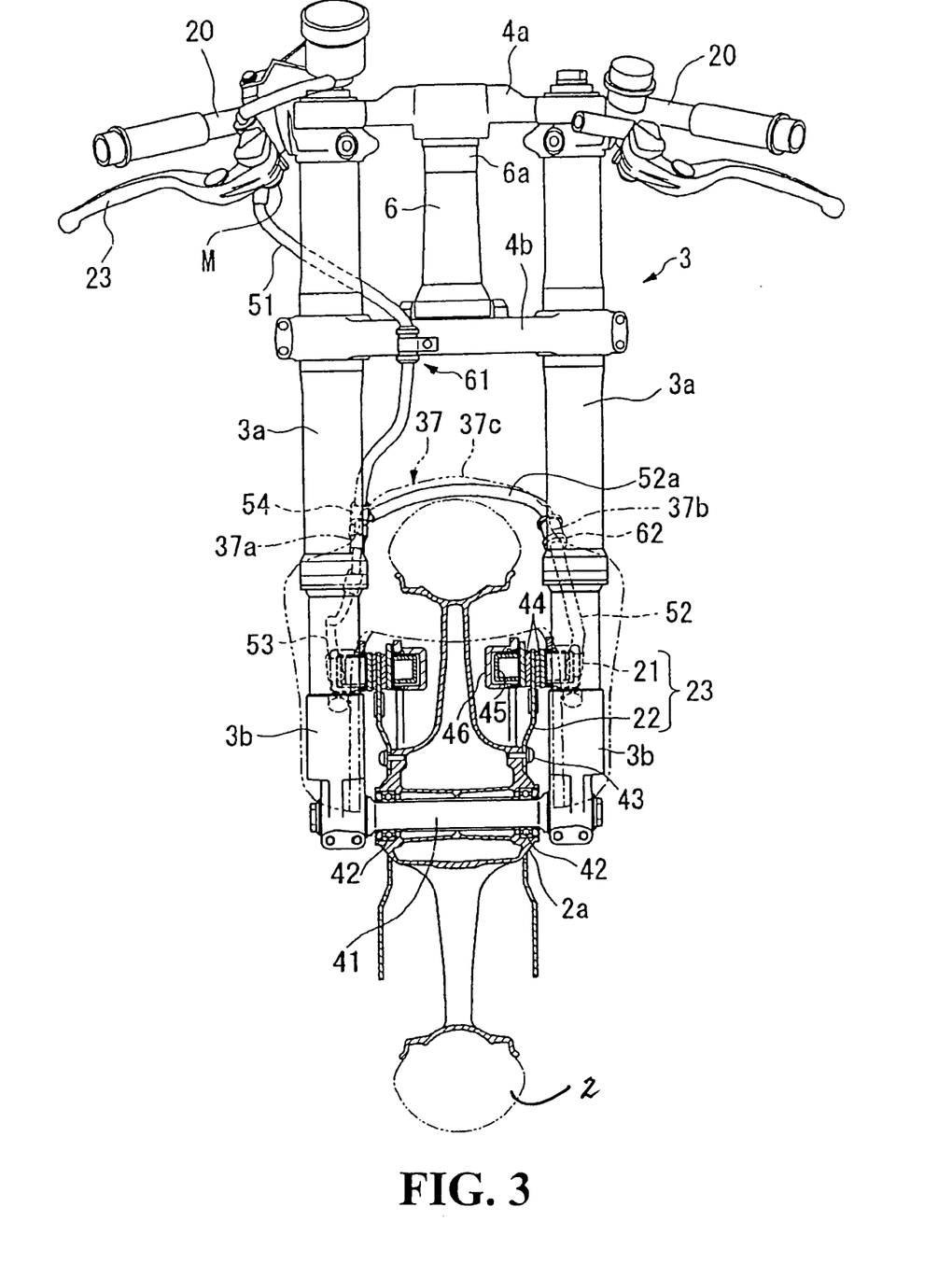
FIG. 3 is a front view of the two-wheel vehicle shown in FIG. 1.

As shown in FIGS. 2 and 3, the front fork 3 is constructed to enable an upper case 3a and a lower case 3b to move toward and away from each other, so as to secure a cushion stroke of the front wheel 2. The upper cases 3a are integrally joined to each other by the top bridge 4a and a bottom bridge 4b which are spaced from each other by a predetermined interval along the axis thereof.

A steering stem 6a is fixed to a central portion in the left-right direction of each of the top bridge 4a and the bottom bridge 4b, and the steering stem 6a is steerably supported on the head pipe 6. The steering handles 20 are mounted to the top bridge 4a, and a master cylinder M for operating the front brake devices 23 is mounted to the right-side steering handle 20.

Both end portions of a front axle 41 for supporting the front wheel 2 are fixed to lower end portions of the lower cases 3b. A hub 2a of the front wheel 2 is supported on the front axle 41 through a left-right pair of ball bearings 42.

The front brake devices 23 are a hydraulic type disk brake composed of the brake rotors 22 fixed to both left and right side surfaces of the hub 2a of the front wheel 2 by bolts 43, and the brake calipers 21 supported on the lower cases 3b through caliper brackets 21a.

The brake caliper 21 includes a pair of brake pad 44 disposed opposite to both side surfaces of the brake rotor 22, pistons 45 for pressing the brake pads 44 against the brake rotor 22, and wheel cylinders 46 for containing these pistons 45 therein respectively.

As shown in FIGS. 2 and 3, a first brake hose 51 is connected to the master cylinder M, a second brake hose 52 is connected to the wheel cylinder 46 of the front brake device 23 on the left side, and a third brake hose 53 is connected to the wheel cylinder 46 of the front brake device 23 on the right side. The first to third brake hoses 51 to 53 are mutually connected (joined) through a hose joint (joint portion) 54, composed of the so-called three-way joint, mounted to a right side surface portion (the vicinity of the side surface portion) 37a of a front fender 37 for covering the front wheel 2 and other vertically movable portions from the upper side.

Incidentally, the first to third brake hoses 51 to 53 are composed of a flexible material.

Figure 4:
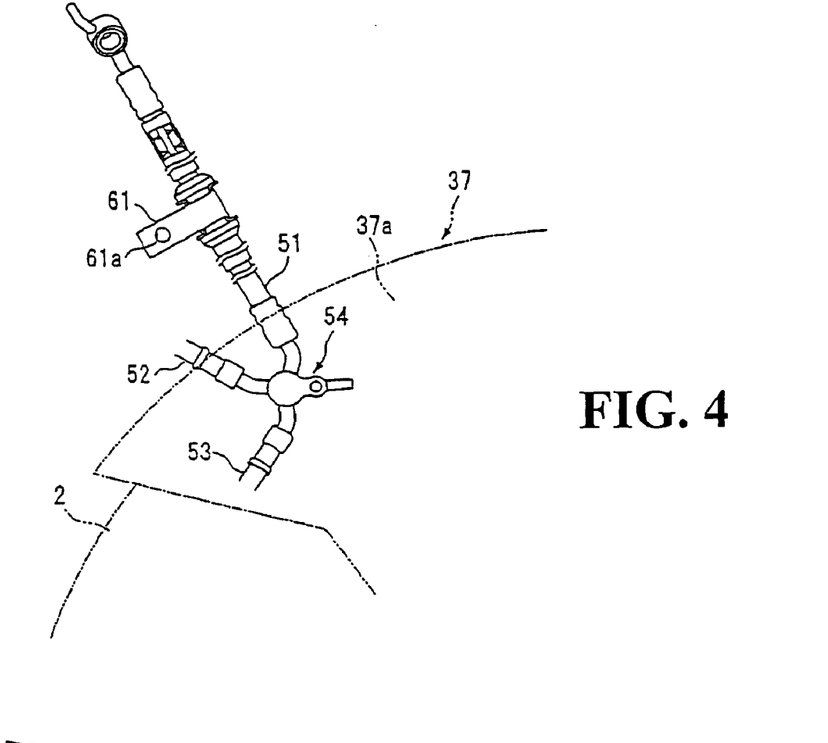
FIG. 4 is a plan view showing the connection relationship between a first brake hose and other brake hoses which are provided in the two-wheel vehicle shown in FIG. 1.

As shown in FIG. 3, the first brake hose 51 is provided with a damper 61 at an intermediate portion thereof. The intermediate portion of the first brake hose 51 is held onto the bottom bridge 4b by a method in which a bolt passed through a through-hole 61a formed in the clamper 61 is screw-engaged with the bottom bridge 4b, as shown in FIG. 4. Namely, the first brake hose 51 extending from the master cylinder M to the front fender 37 is supported on the bottom bridge 4b and the right side surface portion 37a of the front fender 37 through the clamper 61 and the hose joint 54, at the intermediate portion and an end portion thereof.

Of the first brake hose 51, the portion between the clamper 61 and the hose joint connection end side, i.e., the portion between the bottom bridge 4b and the right side surface portion 37a of the front fender 37 is once bent toward the vehicle rear side and then bent back toward the vehicle front side, as shown in FIG. 2. This provides the hose length with an allowance corresponding to the cushion stroke of the front wheel 2.

Figure 5:
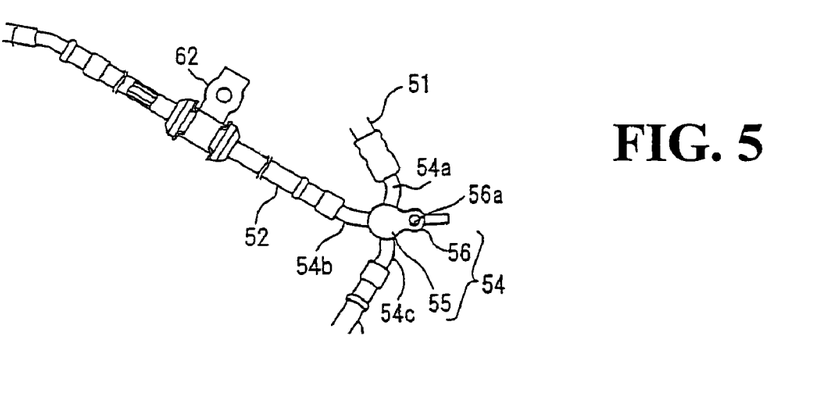
FIG. 5 is a plan view showing the connection relationship between a second brake hose and other brake hoses which are provided in the two-wheel vehicle shown in FIG. 1.

As shown in FIG. 5, the second brake hose 52 is provided with a damper 62 at an intermediate portion thereof. The intermediate portion of the second brake hose 52 is held onto the front fender 37 by a method in which a bolt passed through a through-hole 62a formed in the damper 62 is screw-engaged with a left side surface portion (the side surface portion on the other side) 37b of the front fender 37, as shown in FIG. 2. Namely, the second brake hose 52 extending from the hose joint 54 to the brake caliper 21 on the left side is supported on the left and right side surface portions 37b, 37a of the front fender 37 through the hose joint 54 and the damper 62, at both end portions thereof.

As shown in FIGS. 2 and 3, of the second brake hose 52, the portion between the hose joint 54 and the damper 62 is a bridging portion 52a which is bridgingly disposed on the front fender 37 from the side of the right side surface portion 37a to the side of the left side surface portion 37b roughly along the upper surface of the front fender 37. The bridging portion 52a is bridgingly disposed on the vehicle rear side relative to a top portion 37c of the front fender 37 so that airflows toward the intake port and the radiator 36 which are located on the rear side thereof are not inhibited. In this embodiment, further, the bridging portion 52a is bridgingly disposed on the vehicle rear side relative to the front fork 3, too.

Besides, in the left side view shown in FIG. 2, the portion, on the side of the brake caliper 21, of the second brake hose 52 with the clamper 62 as a boundary is bent at about 90° in relation to the portion on the side of the bridging portion 52a. This ensures that the portion between the damper 62 and the brake caliper 21 on the left side extends roughly rectilinearly, so that the hose length therebetween is substantially minimized.

The third brake hose 53 in this embodiment is not provided with any damper at an intermediate portion thereof, unlike the first and second brake hoses 51 and 52 described above.

As shown in FIG. 3, the third brake hose 53 extending from the hose joint 54 to the brake caliper 21 on the right side is supported respectively by the hose joint 54 and the brake caliper 21 on the right side, at both end portions thereof.

Figure 6:
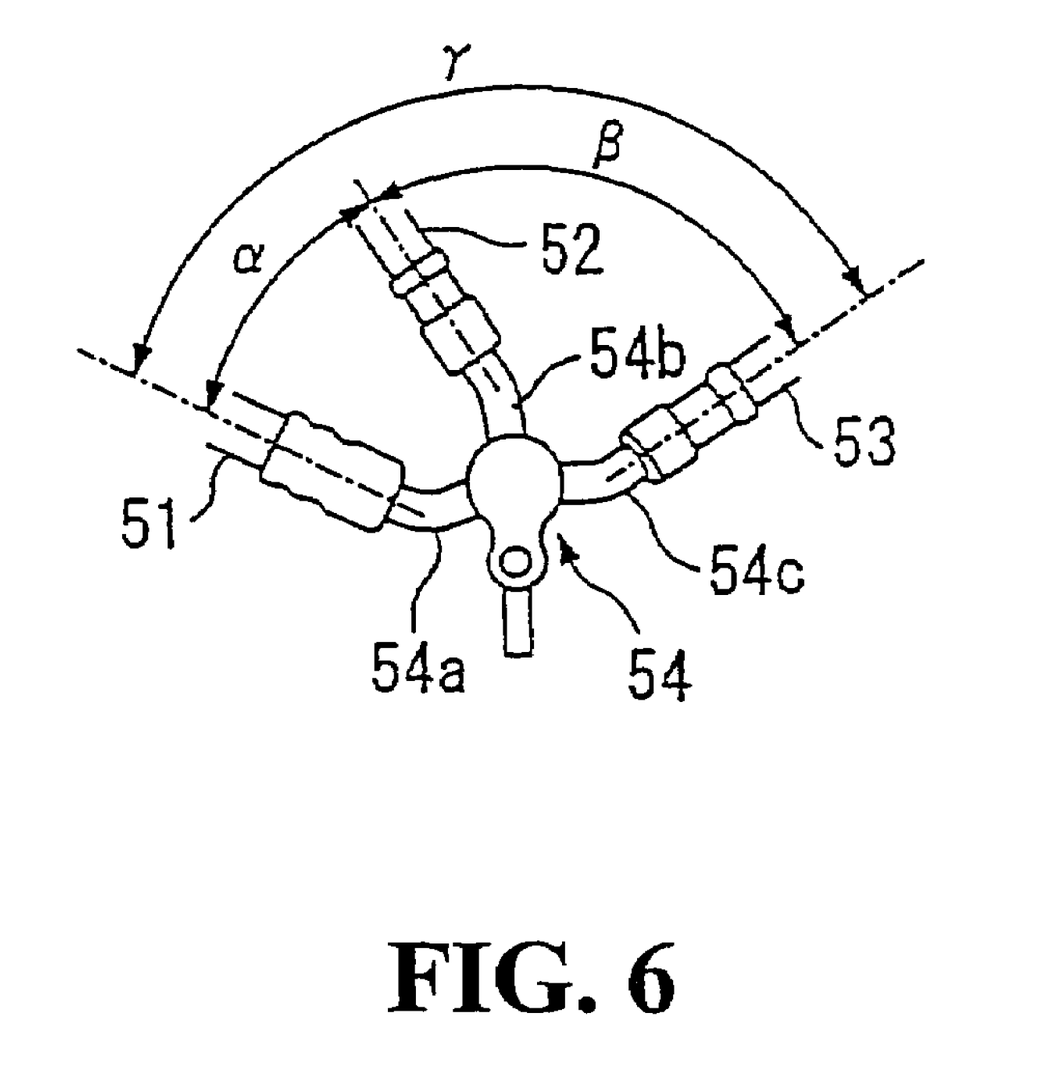
FIG. 6 is a plan view of a hose joint shown in FIGS. 4 and 5.

As shown in FIGS. 4 to 6, the hose joint 54 includes a roughly hollow cylindrical joint main body 55, and the circumferential wall of the joint main body 55 is integrally provided with a bracket 56 in a projected form. The hose joint 54 is fixed to the front fender 37 in such a mount posture that the axis of the joint main body 55 is directed roughly in the left-right direction of the vehicle, by a method in which a bolt passed through a through-hole 56a formed in the bracket 56 is screw-engaged with the front fender 37.

The circumferential wall of the joint main body 55 is provided with first, second and third connection portions 54a, 54b and 54c spaced from each other along the circumferential direction, and the first, second and third brake hoses 51, 52 and 53 are connected to the connection portions 54a, 54b and 54c in this order.

These first to third connection portions 54a to 54c have brake hose connection side end portions so bent that, as shown in FIG. 6, the angle α between the first brake hose 51 and the second brake hose 52 is 35°, the angle β between the second brake hose 52 and the third brake hose 53 is 85°, and the angle γ between the first brake hose 51 and the third brake hose 53 is 115°.

In the configuration as above, when the master cylinder M is operated in order to brake the front wheel 2, the output hydraulic pressure from the master cylinder M is transmitted through the first brake hose 51 to the hose joint 54, where the output hydraulic pressure is distributed into the second and third brake hoses 52 and 53, to be supplied to the wheel cylinders 46 in the left and right brake devices 23, so that braking forces are exerted on the brake rotors 22, whereby the front wheel 2 can be braked.

In this embodiment, in applying such a hydraulic type disk brake to the front wheel 2 of the motorcycle 1, the first brake hose 51 connected to the master cylinder M and the second and third brake hoses 52 and 53 connected respectively to the left and right brake calipers 21 are joined to each other through the hose joint 54 on the front fender 37.

Therefore, the brake hose(s) passing vertically on the front side of the intake port and the radiator 36 is only the first brake hose 51, so that the airflow inhibitive factors blocking the front side of the intake port and the radiator 36 and the length over which the brake hoses are laid are reduced, as compared with the case where the second and third brake hoses 52 and 53 pass vertically on the front side of the intake port and the radiator.

Therefore, sufficient intake efficiency and cooling efficiency can be secured, without causing an increase in weight. Besides, since the need for the baffle plate(s) is eliminated because the intake efficiency and cooling efficiency are thus secured, the number of component parts and the weight would not be increased, and appearance quality can be enhanced.

In addition, in this embodiment, the hose joint 54 constituting the joint portion of the first to third brake hoses 51 to 53 is provided at the right side surface portion 37a of the front fender 37, and the bridging portion 52a of the second brake hose 52 bridgingly disposed from the hose joint 54 to the side of the left side surface portion 37b roughly along the upper surface of the front fender 37 is located on the vehicle rear side relative to the top portion 37c of the front fender 37. Therefore, the provision of the bridging portion 52a does not inhibit the flows of air toward the intake port and the radiator 36 which are located on the rear side thereof.

Accordingly, each of the second and third brake hoses 52 and 53 extended from the hose joint 54 toward the left and right brake calipers 21 respectively would not be an airflow inhibitive factor which blocks the front side of the intake port and the radiator 36, and the intake efficiency and cooling efficiency can be secured more assuredly.

Further, of the first brake hose 51, the portion extending from the bottom bridge 4b toward the hose joint 54 is once bent toward the vehicle rear side and then bent back toward the vehicle front side (FIG. 2) in order to provide the hose length with an allowance, as has been described above. Therefore, an end portion on the hose joint 54 side of the first brake hose 51 is inclined toward the vehicle front side as one goes downwards. If the third brake hose 53 is connected to the hose joint 54 as it is, in the presence of such an inclination, the third brake hose 53 also extends in the same inclination direction as the first brake hose 51, so that at the time of connecting the third brake hose 53 to the brake caliper 21, the third brake hose 53 must be largely bent toward the vehicle rear side at an intermediate portion thereof, and the hose length of the third brake hose 53 may become too long, possibly leading to an increase in weight.

In this embodiment, however, the brake hose connection side end portions of the first to third connection portions 54a to 54c are so bent that the angle γ between the first brake hose 51 and the third brake hose 53 is 115°, so that even though the first brake hose 51 is inclined toward the vehicle front side as one goes downwards, as shown in FIG. 2, the portion on the hose joint 54 side of the third brake hose 53 is substantially directed vertically down, instead of extending along the inclination direction of the first brake hose 51.

This ensures that, of the third brake hose 53, the portion extending from the hose joint 54 to the brake caliper 21 on the right side need not be bent largely, and, therefore, it is possible to effectively obviate the problem of an increase in weight due to a redundant hose length.

In addition, when the hose joint 54 is fixed to the front fender 37 in the above-mentioned mount posture, the angle β between the second brake hose 52 and the third brake hose 53 is about 90° (85°) in the plan view of the vehicle shown in FIG. 3. Therefore, of the second brake hose 52, the bridging portion 52a bridgingly disposed from the right side surface portion 37a to the side of the left side surface portion 37b along the upper surface of the front fender 37, i.e., the portion extending from the hose joint 54 to the damper 62 extends roughly in parallel to the width direction of the front fender 37 in the top plan view of the vehicle.

This ensures that, also as to the second brake hose 52, the hose length at the bridging portion 52a can be substantially minimized, so that it is possible to effectively obviate the problem of an increase in weight due to a redundant hose length.

Incidentally, the present invention is not limited to the above-described embodiment, and various design modifications can be made without departure from the gist of the invention. For example, the object of application of the present invention is not limited to a two-wheel vehicle but may be other mobile body such as three-wheel and four-wheel vehicles, as long as the mobile body includes a hydraulic type disk brake.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake hose support structure for a vehicle for supporting brake hoses ranging from a master cylinder to right and left brake calipers for brakes of a front wheel of the vehicle, the vehicle having a front side, a rear side, a left side, and a right side, and having a front fender that extends in a lengthwise direction of the vehicle and that is disposed between first and second cases of a front fork, the brake hose support structure comprising:

a first brake hose connected to said master cylinder of the vehicle; and second and third brake hoses connected respectively to the left and right brake calipers, wherein the first brake hose, the second brake hose, and the third brake hose are joined to each other on the front fender of the vehicle, the front fender having a surface portion facing upwardly and rearwardly and covering an upper and rear portion of the front wheel, and left and right side surface portions located respectively on left and right sides of the surface portion of the front fender, wherein a hose joint connecting said first, said second, and said third brake hose together is directly mounted on the right side surface portion of said front fender, and wherein said second brake hose has a first end connected to the hose joint directly mounted on the right side surface of the front fender, an intermediate part attached via a clamper to the left side surface portion of the front fender, wherein a section of the second brake hose between the hose joint and the clamper is an exposed bridging portion of the second brake hose that extends in a curved manner along the surface portion of the fender between the hose joint attached on the right side surface portion of the front fender and the clamper attached on the left side surface portion of said front fender, wherein the hose joint directly mounted on the right side surface portion of the front fender and the clamper directly mounted on the left side surface portion of the front fender are both arranged in positions that are behind the front fork of the vehicle, wherein the first brake hose extends downwardly from the master cylinder along an outer side of a right-hand upper case of the front fork, around a rear side of the right-hand upper case, and then extends forwardly and above an upper side of a bottom bridge that extends laterally between the right-hand upper case and a left-hand upper case, and wherein the first brake hose has an intermediate portion that is attached onto a front side of the bottom bridge by another clamper, so that the intermediate portion of the first brake hose in disposed on a right side of a head pipe, wherein another portion of the first brake hose extending below the another clamper on the bottom bridge curves downwardly and rearwardly between the right-hand upper case and the left-hand upper case of the front fork, and then curves downwardly and forwardly toward the vehicle front side and is connected to the hose joint behind a right-hand lower case of the front fork, the hose joint includes a hollow cylindrical joint main body, and a circumferential wall of the joint main body is integrally provided with a lobe-shaped projection for fixing the hose joint to the right side surface portion of the front fender, wherein the lobe-shaped projection extends in a direction toward the front side of the vehicle, and wherein when viewed in a front view, the third brake hose is completely hidden behind the right-hand upper case and a right-hand lower case of the front fork, wherein the circumferential wall of the joint main body is provided with first, second and third connection portions spaced from each other along a circumferential direction, and the first brake hose, the second brake hose, and third brake hose are connected to the first connection portion, the second connection portion, and the third connection portion, respectively.

2. The brake hose support structure as set forth in claim 1, wherein the first connection portion, the second connection portion, and the third connection portion have brake hose connection side end portions so bent that, an angle α between the first brake hose and the second brake hose is 35°, an angle β between the second brake hose and the third brake hose is 85°, and an angle γ between the first brake hose and the third brake hose is 115°, so that even though a lower portion the first brake hose that connects to the hose joint is inclined toward the vehicle front side, the third brake hose is directed substantially vertically down from the hose joint, instead of extending along the inclination direction of the first brake hose, thereby ensuring that the third brake hose extending from the hose joint to the brake caliper on the right side is not bent largely, and, therefore, it is possible to effectively obviate the problem of an increase in weight due to a redundant hose length.

3. The brake hose support structure as set forth in claim 1, wherein among the first brake hose, the second brake hose, and the third brake hose, only the first brake hose extends above an upper-most portion of the front fender, so that the second brake hose and the third brake hose do not inhibit airflow passing above the front fender.

4. The brake hose support structure as set forth in claim 1, wherein the first brake hose and the third brake hose are disposed entirely on one side of the vehicle, and the second brake hose extends between two sides of the vehicle, 5. The brake hose support structure as set forth in claim 1, wherein the hose joint includes a joint main body and lobe-shaped projection extending from the joint main body in a direction toward the front side of the vehicle, the lobe-shaped projection having a screw hole, the screw hole adapted to accommodate a fastener for mounting the hose joint to which an upper end of the second brake hose is connected, wherein each of the three brake hoses extends from the joint main body.

6. A brake hose support structure for a vehicle for supporting brake hoses ranging from a master cylinder to right and left brake calipers on the vehicle, the vehicle having a front side, a rear side, a right side, and a left side, and having a front fender disposed between first and second cases of a front fork and extending in a lengthwise direction of the vehicle, the brake hose support structure comprising:

a first brake hose connected to said master cylinder of the vehicle; and second and third brake hoses connected respectively to the left and right brake calipers, wherein the first brake hose, the second brake hose, and the third brake hose are joined to each other on the front fender, the front fender having a surface portion facing upwardly and rearwardly, and right and left side surface portions located respectively on opposite sides of the surface portion of the front fender facing upwardly and rearwardly, wherein a hose joint connecting said first, said second, and said third brake hose together is directly mounted on the right side surface portion of said front fender, and wherein said second brake hose has a first end connected to the hose joint mounted on the right side surface of the front fender, an intermediate part attached by a clamper that is directly mounted on the left side surface portion of the front fender, and wherein a part of the second brake hose is an exposed bridging portion that extends in a curved manner along the surface portion of the front fender between the hose joint mounted on the right side surface portion of the front fender and the clamper attached on the left side surface portion of said front fender, wherein the hose joint and the clamper are both disposed behind the front fork of the vehicle, wherein the first brake hose extends downwardly from the master cylinder along an outer side of a right-hand upper case of the front fork, around a rear side of the right-hand upper case, and then extends forwardly and above an upper side of a bottom bridge that extends laterally between the right-hand upper case and a left-hand upper case, and wherein the first brake hose has an intermediate portion that is attached onto a front side of the bottom bridge by another clamper, so that the intermediate portion of the first brake hose in disposed on a right side of a head pipe, wherein another portion of the first brake hose extending below the another clamper on the front side of the bottom bridge curves downwardly and rearwardly between the right-hand upper case and a left-hand upper case of the front fork, and then curves downwardly and forwardly toward the vehicle front side and is connected to the hose joint behind a right-hand lower case of the front fork, the hose joint includes a hollow cylindrical joint main body, and a circumferential wall of the joint main body is integrally provided with a lobe-shaped projection for fixing the hose joint to the right side surface portion of the front fender, wherein the joint main body is disposed rearwardly with respect to the lobe-shaped projection, and wherein when viewed in a front view, the third brake hose is completely hidden behind the right-hand upper case and a right-hand lower case of the front fork, wherein the circumferential wall of the joint main body is provided with first, second and third connection portions spaced from each other along a circumferential direction, and the first brake hose, the second brake hose, and third brake hose are connected to the first connection portion, the second connection portion, and the third connection portion, respectively.

7. The brake hose support structure as set forth in claim 6, wherein said exposed bridging portion of the second brake hose extends from on the right side surface portion of the front fender where it is connected by the hose joint mounted on the front fender to on the left side surface portion of the front fender where it is held via the clamper attached to the front fender.

8. The brake hose support structure as set forth in claim 6, wherein the first connection portion, the second connection portion, and the third connection portion have brake hose connection side end portions so bent that, an angle α between the first brake hose and the second brake hose is 35°, an angle β between the second brake hose and the third brake hose is 85°, and an angle γ between the first brake hose and the third brake hose is 115°, so that even though a lower portion the first brake hose that connects to the hose joint is inclined toward the vehicle front side, the third brake hose is directed substantially vertically down from the hose joint, instead of extending along the inclination direction of the first brake hose, thereby ensuring that the third brake hose extending from the hose joint to the brake caliper on the right side is not bent largely, and, therefore, it is possible to effectively obviate the problem of an increase in weight due to a redundant hose length.

9. The brake hose support structure as set forth in claim 6, wherein among the first brake hose, the second brake hose, and the third brake hose, only the first brake hose extends above an upper-most portion of the front fender, so that the second brake hose arid the third brake hose do not inhibit airflow passing above the front fender.

10. The brake hose support structure as set forth in claim 6, wherein the first brake hose and the third brake hose are disposed entirely on the right side of the vehicle, and the second brake hose extends between the right and left sides of the vehicle.

11. The brake hose support structure as set forth in claim 6, wherein the hose joint includes a joint main body and lobe-shaped projection extending from the joint main body in a direction toward the front side of the vehicle, the lobe-shaped projection having a screw hole, the screw hole adapted to accommodate a fastener for attaching the hose joint to which an upper end of the second brake hose is connected wherein each of the three brake hoses extends from the joint main body.

* * * * *